(12) United States Patent
Redlich

(10) Patent No.: US 6,816,629 B2
(45) Date of Patent: Nov. 9, 2004

(54) METHOD AND SYSTEM FOR 3-D CONTENT CREATION

(75) Inventor: Arthur Norman Redlich, Metuchen, NJ (US)

(73) Assignee: Realty Mapping LLC, Metuchen, NJ (US)

(*) Notice: Subject to any disclaimer, the term of this patent is extended or adjusted under 35 U.S.C. 154(b) by 614 days.

(21) Appl. No.: 09/948,434

(22) Filed: Sep. 7, 2001

(65) Prior Publication Data

US 2003/0058242 A1 Mar. 27, 2003

(51) Int. Cl.7 .............................. G06K 9/36; G06T 15/00
(52) U.S. Cl. ..................... 382/285; 382/154; 345/419
(58) Field of Search .................................. 382/154, 285, 382/289, 293–296, 312; 348/43, 48; 356/376, 603; 345/649, 653, 654, 418, 419, 420, 664

(56) References Cited

U.S. PATENT DOCUMENTS

| | | | | |
|---|---|---|---|---|
| 5,682,198 A | * | 10/1997 | Katayama et al. | 348/47 |
| 6,028,672 A | * | 2/2000 | Geng | 356/602 |
| 6,341,016 B1 | * | 1/2002 | Malione | 356/603 |
| 6,496,598 B1 | * | 12/2002 | Harman | 382/154 |
| 6,504,569 B1 | * | 1/2003 | Jasinschi et al. | 348/43 |
| 6,661,913 B1 | * | 12/2003 | Zhang et al. | 382/154 |

OTHER PUBLICATIONS

Ramesh Jain; Direct Computation of the Focus of Expansion; IEEE Transactions on Pattern Analysis And Machine Intelligence, vol. PAMI–5, No. 1, Jan. 1983; pp. 58–64.
Frank Dellaert, Steven M. Seitz, Charles E. Thorpe, Sebastian Thrun; Structure From Without Correspondence; © 2000 IEEE; pp. 557–564.
Kenichi Kanatani; Geometric Computation for Machine Vision; Oxford Engineering Science Series 37 © 1993.
Michael S. Lew, Nicu Sebe, Thomas S. Huang; Improving Visual Matching; © 2000 IEEE; pp. 58–65.

* cited by examiner

Primary Examiner—Kanji Patel
(74) Attorney, Agent, or Firm—Kenyon & Kenyon

(57) ABSTRACT

The present invention provides a method and system for generation of 3-D content from 2-D sources. In particular, the present invention provides a method for determining a point cloud from one or more 2-D sources. The method of the present utilizes a search process for locating a point of maximal crossing of line segments, wherein each line segment line is generated for each possible point match between an image point in a first 2-D scene data source and an image point in a second 2-D scene data source. The search is performed over all possible camera rotation angles. The point cloud solution generated by the methods of the present invention may then be utilized as input to perform texture mapping or further 3-D processing.

12 Claims, 13 Drawing Sheets

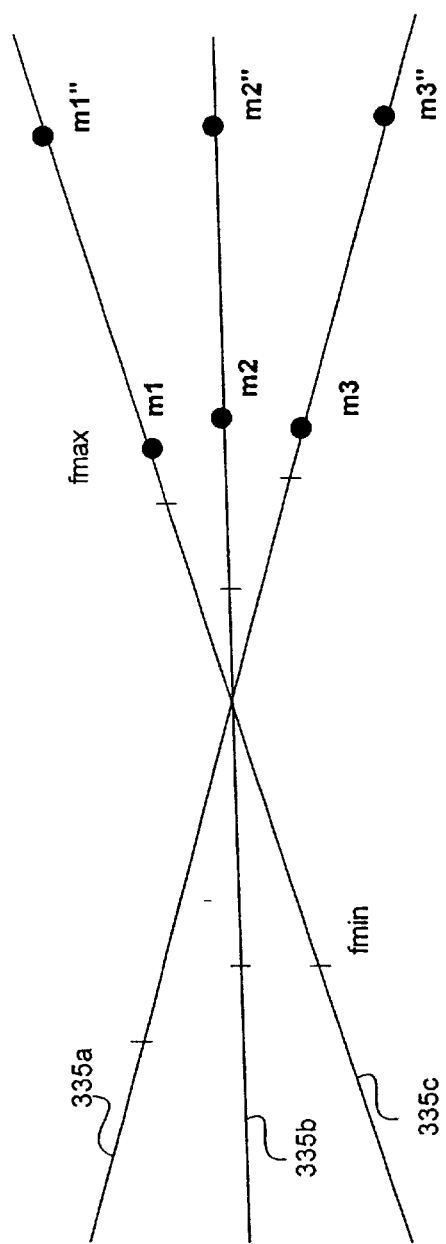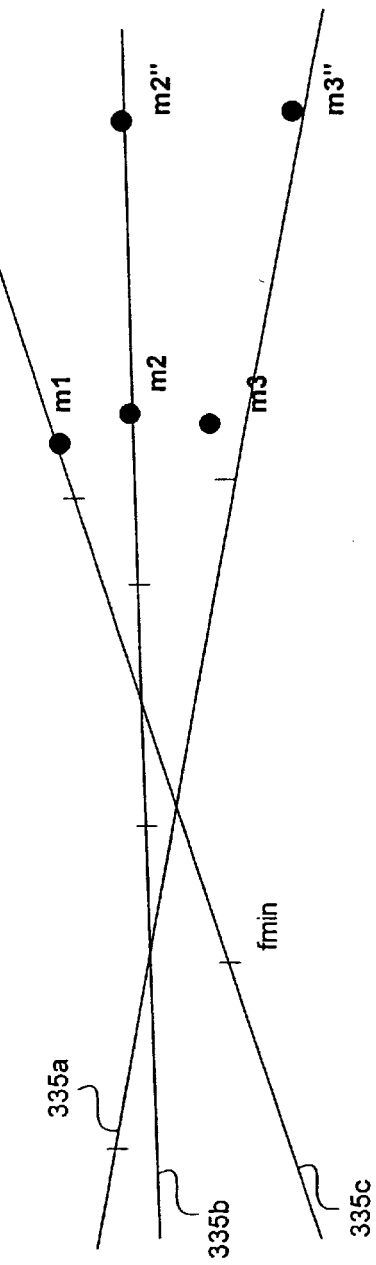

METHOD AND SYSTEM FOR 3-D CONTENT CREATION

FIELD OF THE INVENTION

The present invention pertains to the areas of image processing and machine processing of images. In particular, the present invention relates to a method for performing photo-realistic 3-D content creation from 2-D sources such as photographs or video.

BACKGROUND INFORMATION

It is often desirable to generate a three-dimensional ("3-D") model of a 3-D object or scene. A 3-D representation of an object may be utilized in a computer graphics context for presenting 3-D content to users to increase the effectiveness and reality of images. One method for generating 3-D information is achieved utilizing the techniques of projective geometry and perspective projection: a 2-D projective space is a perspectively projected image of a 3-D space.

Typically, image data is obtained utilizing a digital imaging system, which captures a plurality of 2-D digitally sampled representations of a scene or object (scene data sources). In the alternative, an analog source (such as an image obtained from a traditional camera) may be utilized and digitized/sampled using a device such as a scanner. The 2-D digital information representing the scene or object may then be processed using the techniques of computational projective geometry and texture mapping to generate the structure of a 3-D image.

FIG. 1a is a flowchart that depicts a general paradigm for generating a 3-D model of a scene or object from a plurality of 2-D scene data sources. The process is initiated in step 151. In step 154, a plurality of 2-D scene data sources are generated by generating respective 2-D images of the scene utilizing a variety of perspectives (i.e., camera positions). In step 155, using the techniques of computational projective geometry, the shape of the image is deduced by determining a 3-D feature set associated with the scene or object. For example, if the prominent features determined in step 153 are a points, a point cloud {X} may be generated. A point cloud is 3-D information {X} for a set of pre-determined points on a desired image or object. In step 157, a texture mapping process is applied to the point cloud solution to generate a 3-D model of the scene or object. The process ends in step 159.

Generating a 3-D point cloud set from a plurality of 2-D sources depends upon two interrelated sub-problems: the camera calibration problem and the point-matching problem. Specifically, the camera calibration problem requires calculating the relative camera rotations R and translations T associated with the plurality of 2-D scene data sources. The point matching problem requires determining a correspondence of image points in at least two scene data sources.

One known technique for determining the 3-D shape of an object (the point cloud) relies upon the use of input from two or more photographic images of the object, taken from different points of view. This problem is known as the shape from motion ("SFM") problem, with the motion being either the camera motion, or equivalently, the motion of the object. In the case of two images, this problem is known also as the stereo-vision problem. The process of extracting a 3-D point cloud from stereo pairs is known as photogrammetry. Once the shape is determined, it is then possible to map the textures of the object from the photographs to the 3-D shape and hence create a photo-realistic virtual model of the object that can then be displayed in standard 3-D viewers such as a VRML ("Virtual Reality Modeling Language") browser.

In order to solve the SFM problem, the relative positions and orientations of the cameras must be known or calculated. This is known as solving the camera calibration problem. This camera calibration problem can be solved if at least 5–8 points can be matched on each of the images, corresponding to the same physical 3-D points on the actual object or scene (In practice, the number of points required for robust estimation is typically far greater than 8). In place of points, line segments, or complete object sub-shapes may be matched instead of points.

Once the cameras have been calibrated, or simultaneously, object shape can be calculated. Knowing point correspondences, together with the camera calibration provides a sufficient set of constraints to allow calculation of the 3-D positions of all corresponding points utilizing the techniques of projective geometry. If enough points are matched then the object shape emerges as a point cloud. These points can be connected to define surfaces and hence determine the complete 3-D surface shape of objects.

Automatic point-matching algorithms have been developed to match image points from one 2-D image source to another (see [Lew et al] for a brief survey of the better known feature matching algorithms). These automatic point matching algorithms, however, have difficulties when the camera points of view differ significantly. In that case, there is significant distortion in the patterns required for point matching, due to perspective foreshortening, lighting variations, and other causes. For this reason, such approaches tend to work best when the camera points of view are very close to each other, but this limits their applicability.

Another approach, which has been exploited, is to assume that a set of prominent points on the object in the images can be determined, but that the point correspondence between images is not known. In this case, the 3-D constraints are used to solve not only the calibration and shape problem, but also the point-matching problem. If this can be done, then there are many practical cases where automation can be used to find the object shape. This approach is referred to herein as the method of uncalibrated point matching through perspective constraints ("UPMPC").

Relatively little work has been done to solve the UPMPC problem, partly because it has appeared to be more difficult than solving the point matching directly, or because it appears to require extremely time consuming calculations, proportional to the number of points factorial squared: (N!)(N!). For example, Dellaert et al proposes a UPMPC solution relying upon on a statistical sampling method. Jain proposes a UPMPC solution utilizing a set of constraints, assumptions and a minimization methodology.

However, known UPMPC solutions are generally deficient in two respects. First, these UPMPC methods typically are very slow due to the great computational complexity associated with the (N!)(N!) complexity limiting their application. Second, known UPMPC methods are not typically tolerant to noise and are therefore not robust solutions for use in industry.

Computational Projective Geometry Mathematical Background and Definitions

The following mathematical background and definitions were taken from Kanatani, Geometric Computation for Machine Vision (Clarendon Press, 1993). FIG. 1b depicts an illustration of a camera model, which provides a conventional model for the 3-D interpretation of perspective projection. Lens 114 projects 3-D object 130 onto film 125 as image 120. Known constant f (focal length) is the distance between lens center 105 and film surface 125.

FIG. 1c depicts a perspective projection of a scene and a relationship between a space point and an image point. Points on image plane 135 are typically designated by a triplet (m1, m2, m3) of real numbers and are referred to as homogeneous coordinates. If m3≠0, point (m1, m2, m3) is identified with the point:

$$x = f\frac{m_1}{m_3}, y = f\frac{m_2}{m_3}$$

on image plane 135. A line is also defined by a triplet (n1, n2, n3) of real numbers, not all of them being 0. These three numbers are referred to as the homogenous coordinates of the line.

By definition, homogenous coordinates can be multiplied by an arbitrary nonzero number, and the point or line that they represent is still the same. then, they are represented as normalized vectors, or N-vectors, such that:

$$N[u] = \frac{u}{\|u\|}$$

Space point 150 having coordinates (X,Y,Z) in space is projected onto the intersection of image plane 135 (Z=f) with the ray starting from the viewpoint O and passing through space point 150 such that space point 150 is projected onto corresponding image point 160 on image plane 135. Image point 160, having image coordinates (x,y), is associated with space point 150 (X,Y,Z) by the perspective projection equation $$x = f\frac{X}{Z}, y = f\frac{Y}{Z}.$$

Thus, scene coordinates (e.g., coordinates (X,Y,Z) of scene point 160) can be identified with homogeneous coordinates (X, Y, Z) on image plane 135. The x and y-coordinates are called image coordinates or inhomogeneous coordinates. Thus, space point P 150 is mapped to inhomogeneous image point 160 as follows:

$$P(X, Y, Z) \rightarrow f\begin{pmatrix} \frac{X}{Z} \\ \frac{Y}{Z} \end{pmatrix}$$

The N-vector m of a point P on image plane 120 refers to the unit vector starting from viewpoint O 115 and pointing toward or away from the image point (e.g., 160). (i.e., the N-vector indicates the orientation of the line connecting that point and viewpoint O). The N-vector of a space point (e.g., 150) is defined to be the N-vector of its projection on image plane 135. Images may be analyzed in terms of N-vectors by regarding the images as perspective projections of 3-D scenes utilizing the camera model shown in FIG. 1b.

3-D content may be generated from a plurality of 2-D scene data sources (images) obtained using photographic methods. The 3-D data is generated utilizing computational geometry based upon perspective constraints associated with the 2-D scene data sources, having different camera positions and orientations.

Thus, for example, for each 2-D scene data source (image) from which 3-D information is to be deduced, the camera is associated with a translation and rotation parameter. In particular, the 3-D motion of a camera is specified by the motion parameters {R, T} where R is a 3×3 rotation matrix, $R^T(=R^{-1})R=I$, representing the rotation between camera 1 (camera 1 pertaining to the first image) and camera 2 (camera 2 pertaining to the second image) and T is a 3-D translation vector representing the translation between camera 1 and camera 2.The X'Y'Z' camera coordinate system after the motion is obtained from the XYZ camera coordinate system before the motion by (i) rotating the coordinate axes around the origin O by R and translating the axes by T where R and T are defined with respect to the original XYZ coordinate system. If the camera is rotated around the center of the lens a new image is observed. Specifically, for the group of camera rotation transformations, a space point P 150 associated with N-vector m is transformed into N-vector m' after the camera rotation. If the camera rotation is specified by rotation matrix R, then $$m'=\pm R^T m, n'=\pm R^T n$$

where (m is the N-vector of a space point and n is the N-vector of a space line) because rotating the camera relative to the scene by R is equivalent to rotating the scene relative to the camera by $R^{-1}$ (=$R^T$).

Similarly, a translation of the camera causes an effective translation of the object relative to the camera and the resulting image motion of points and lines reveal their 3-D geometries. If P is a space point 150 with associated N-vector m. Then, $\overline{OP}$=rm where r is the depth of P. Thus, the 3-D position of a space point P 150 is completely specified by the pair {m, r}. 3-D reconstruction of an image point based upon 2-D data therefore means computation of the depth of the space point represented by {m, r}.

If the camera is translated by T, the representation {m, r} of a space point changes into {m', r'} in the form:

$$m'=N[rm-T], r'=\|rm-T\|$$

For a camera motion {R, T}, if R is known, the camera rotation transformation can be applied to undo the effect of the rotation by rotating the second frame by $R^{-1}(=R^T)$. In particular, if m' and n' are the N-vectors of a space point and a space line in the second frame respectively, they are replaced by Rm' and Rn', respectively. Thus, after a camera motion {R, T}, the representation {m,r} of a space point changes into {m', r'} in the form:

$$i\ m'=R^T N[rm-T], r'=\|rm-T\|$$

FIG. 2a depicts a camera motion with respect to the camera coordinate system according to one embodiment of the present invention. As shown in FIG. 2a, space point P 150 is associated with N-vector m and depth r such that. $\overline{OP}$=rm.

FIG. 2b depicts a camera motion with respect to the scene coordinate system according to one embodiment of the present invention. Camera motion {R, T} is applied such that with respect to the camera coordinate system $\overline{O'P}$=r'm' because the second camera coordinate system is rotated by R.

As shown in FIG. 2b, the following geometric relationship is obtained:

$$rm=T+r'Rm', \text{ or } rm-r'Rm=T$$

Thus, given two sets of unit vectors $\{m_\alpha\}$ and $\{m'_\alpha\}$=1, ... N, the following relationship is obtained:

$$r_\alpha m_\alpha - r'_\alpha Rm'_\alpha = T, \alpha=1, \ldots N.$$

FIG. 3 depicts a relationship between epipolar lines and corresponding points within a 3-D scene. In particular, as shown in FIG. 3, m is the N-vector of a 2-D point on a first image. m' is the N-vector of a corresponding 2-D point on a second image. u is the N-vector of the correct epipole on the first image. u'=Ru is the epipole on the second image. Note that image line 335a, which is an epipolar, connects epipole associated with u with the image point associated with N-vector m. The N-vector associated with epipolar 335a may be expressed as the N-vector of the cross-product m×u. FIG. 3 also shows second image point associated with N-vector m'. The image line defined by the image point associated with N-vector m' and the image point associated with u' defines epipolar 335b. Epipolar 335b may be expressed as R(m×u).

FIG. 3 further shows N-vector m"=Rm" which is associated with the image point generated by rotating the image point associated with N-vector m' back to the first image. If the point correspondence m, m' is correct, the image point associated with m"=Rm' should lie on the epipolar line, m×u, formed by the epipole u and the image point m.

FIG. 4 depicts three correctly matching sets of points (m1, m1"), (m2, m2"), (m3, m3") (335a, 335b and 335c). Note that epipolar lines 335a–335c intersect at common epipole u.

FIG. 5 depicts three incorrectly matching sets of points (m1, m1"), (m2, m2") and (m3, m3") (335a, 335b and 335c). Note that a common intersection is highly unlikely in the case of incorrect point correspondences or choice of incorrect R matrix. This is a key observation, since the common crossing can therefore be used to select out lines corresponding to correct pairs and correct R.

SUMMARY OF THE INVENTION

The present invention provides a UPMPC method and system for generation of 3-D content from 2-D sources. In particular, the present invention provides a UPMPC method for determining a point cloud from one or more 2-D sources. The method of the present utilizes a search process for locating a point of maximal crossing of line segments, wherein each line segment line is generated for each possible point match between an image point in a first 2-D scene data source and an image point in a second 2-D scene data source. The search is performed over all possible camera rotation angles. The process defined by the present invention may be applied to each possible pair of 2-D scene data sources to generate a highly robust solution. Use of the method provided by the present invention allows significantly reduced computational complexity for generating a 3-D point cloud (order N^2 vs. (N!)(N!) for conventional approaches), which results in significant speed improvement the 3-D content generation process. The process defined by the present invention is also highly noise tolerant. The point cloud solution generated by the methods of the present invention may then be utilized as input to perform texture mapping or further 3-D processing.

A plurality of 2-D scene data sources of the image are obtained either from traditional photographic imaging techniques or from digital imaging techniques. Each of the 2-D scene data sources is associated with a translation parameter and a rotation parameter respectively describing a camera translation and rotation. Each 2-D scene data source includes a plurality of image points, which are associated with the previously identified space points in the 3-D scene. The correspondence of image points between any two 2-D scene data sources is unknown. Furthermore, an epipole is implicitly defined between any two of the 2-D scene data sources, wherein the epipole is a function of the translation parameter relating the 2-D scene image sources.

The present invention utilizes a search algorithm to find a point of maximal crossing of a plurality of the line segments across all possible camera rotation angles. The present invention relies upon the observation that corresponding points between two 2-D scene data sources will lie on the same epipolar line (when the points are considered with respect to a common rotation angle) if the rotation angle and point correspondence are both correct (i.e., there is a zero rotation angle of the points with respect to one another—the points are rotationally neutral with respect to one another). The point of maximal crossing of the line segments defines the epipole.

In order to significantly reduce computational complexity, a motion constraint is defined, wherein the motion constraint defines a maximum value of a ratio (r/r') and a minimum value of the ratio (r/r'), wherein the ratio (r/r') represents a ratio between a first distance (r) to an image point and a second distance (r') to the image point after a camera translation (T). Effectively the motion constraint defines a continuous range of values of possible camera translations, the range of values defining the length of each line segment. If the chosen camera angle and point correspondence are correct, the true epipole will lie somewhere on the line segment (that is the line segment will span a portion of an epipolar line).

By searching over all possible point correspondences and rotation angles, a point of maximal crossing is determined. The rotation parameter generating the maximal crossing point defines the desired rotation parameter. The point of maximal crossing defines the epipole and directly from this, the translation parameter is determined. Finally, point correspondence information is determined by determining the point correspondences, which produced the line segments meeting at the point of maximal crossing. A 3-D point cloud {X} is determined as a function of the best rotation parameter, the best translation parameter and the point correspondence information using projective geometry relations.

According to one embodiment, the present invention provides a method for generating 3-D content from a plurality of 2-D sources, herein referred to as the "T-Crossing method," a UPMPC method that generates a point cloud solution. The T-Crossing method provides significantly reduced computational complexity by utilizing the motion constraint described above.

In general, the T-Crossing method operates by performing the following: (i) generating a line segment for each possible point correspondence between an image point associated with a first 2-D scene data source and an image point associated with a second 2-D scene data source as a function of an associated motion constraint; (ii) for each of a plurality of possible rotation parameters, determining a point of maximal crossing point associated with the line segments generated in (i); (iii) determining a best rotation parameter, wherein the best rotation parameter is associated with a best maximal crossing point; (iv) determining a best translation parameter, wherein the best translation parameter is associated with an N-vector of the best maximal crossing point determined in (iii); (v) determining point correspondence information, wherein the point correspondence information is obtained by finding all point correspondences that produced line segments meeting at the maximal crossing point.

According to one embodiment, the T-Crossing algorithm receives as input, a plurality of scene data sources (set of image points on two images). Based upon this input, the T-Crossing method determines a best rotation matrix R, translation vector T and index matrix I' for a first 2-D scene data source and a second 2-D scene data source, wherein the index matrix I' represents point correspondences between the first and scene data sources. Use of the T-Crossing method obviates the need for determining in advance which points match, and there is no need for all points on the first image to have matches on the second image.

According to one alternative embodiment, the T-Crossing method is applied multiple times, respectively to multiple image pairs to generate multiple point cloud solutions $\{X\}_1$-$\{X\}_N$. The multiple point cloud solutions $\{X\}_1$-$\{X\}_N$ are combined to determine a best solution $\{X\}_{best}$. To compare the multiple point cloud solutions $\{X\}_1$-$\{X\}_N$, the respective calibrations R and T are utilized to transform the $\{X\}$ from each pair to a common coordinate system where the comparison may be performed. $\{X\}_{best}$ is then calculated by averaging, determining the median or using some other method.

In some situations a degeneracy arises that cannot be resolved utilizing the T-Crossing method alone. This degeneracy is indicated were I' is a block diagonal matrix. According to one alternative embodiment a method herein referred to as the Epipolar Clustering Method ("EPM") is applied to reduce I' from a block diagonal matrix to a diagonal matrix.

The T-crossing method also works well when the point matches are known. In this case, the problem is the more traditional one, and the difficulty being solved is the noise coming from poor automatic or hand matching. The T-Crossing method deals with this noise in a different way and is quite noise tolerant. Also, the algorithm can be used for any of the intermediate problems, where some, but not all, point matches are known, or there are simply some constraints on the possible point matches.

A significant advantage of the T-Crossing algorithm is its ability to easily exploit any known constraints on possible point matches. For example, an unreliable feature-matching algorithm might be good enough to limit possible point matches to small sub-sets. Or a known restriction on camera movement might imply that a point in one image must have its match within some restricted region on the second image.

Moreover, the T-Crossing algorithm can also exploit constraints on the 3-D points themselves. Such constraints may come from the use of other approaches that provide crude initial results. They may also come from having applied the T-Crossing algorithm to other image pairs. That is, an imperfect solution from one pair can be bootstrapped to improve the solutions for successive pairs.

BRIEF DESCRIPTION OF THE DRAWINGS

FIG. 4 depicts three correctly matching sets of points (m1, m1"), (m2, m2"), (m3, m3") producing corresponding epipolar lines.

FIG. 5 depicts three incorrectly matching sets of points (m1, m1"), (m2, m2") and (m3, m3") producing corresponding epipolar lines.

DETAILED DESCRIPTION

The present invention provides UPMPC method and system for generation of 3-D content from 2-D sources. In particular, the present invention provides a UPMPC method for determining a point cloud from one or more 2-D sources. The method of the present invention utilizes a search process for locating a point of maximal crossing of line segments, wherein each line segment line is generated for each possible point match between an image point in a first 2-D scene data source and an image point in a second 2-D scene data source. The search is performed over all possible camera rotation angles. The point cloud solution generated by the methods of the present invention may then be utilized as input to perform texture mapping or further 3-D processing.

Figure 1A:
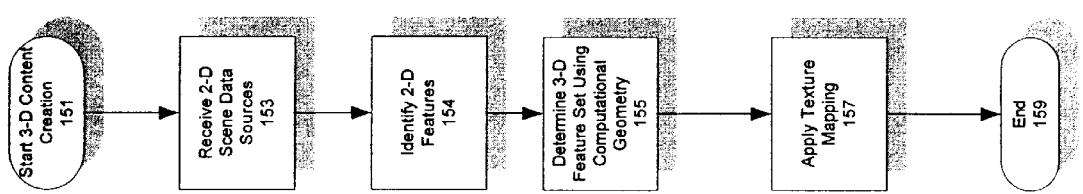
FIG. 1a is a flowchart that depicts a general paradigm for generating a 3-D model of a scene or object from a plurality of 2-D scene data sources.
Figure 1B:
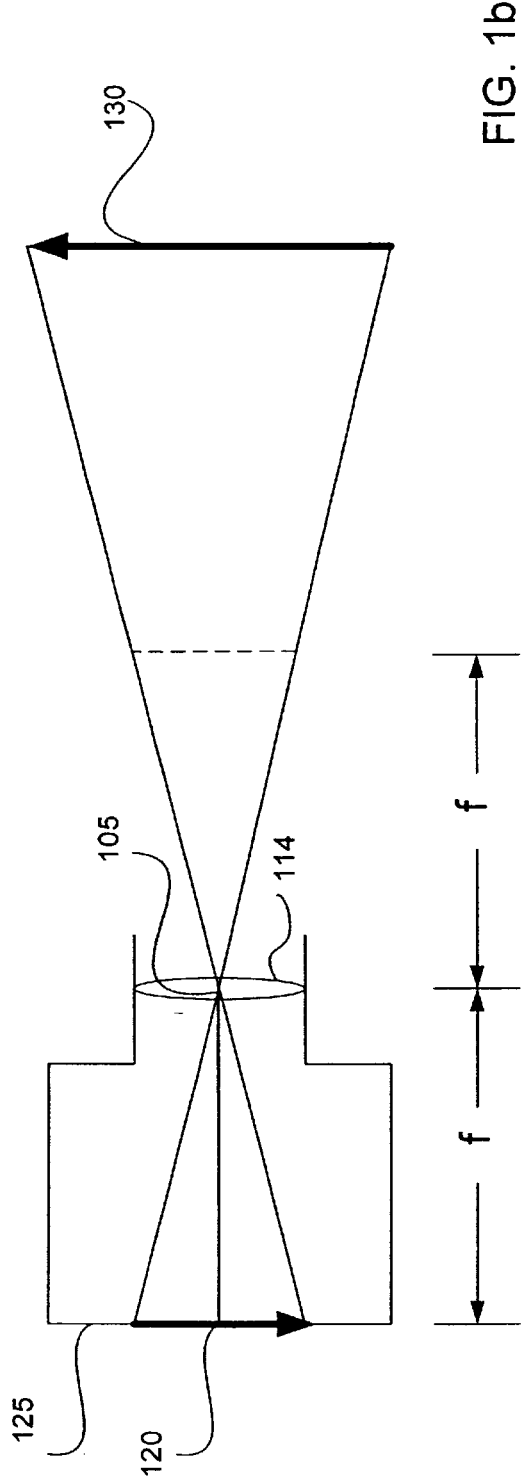
FIG. 1b depicts an illustration of a camera model, which provides a conventional model for the 3-D interpretation of perspective projection.
Figure 1C:
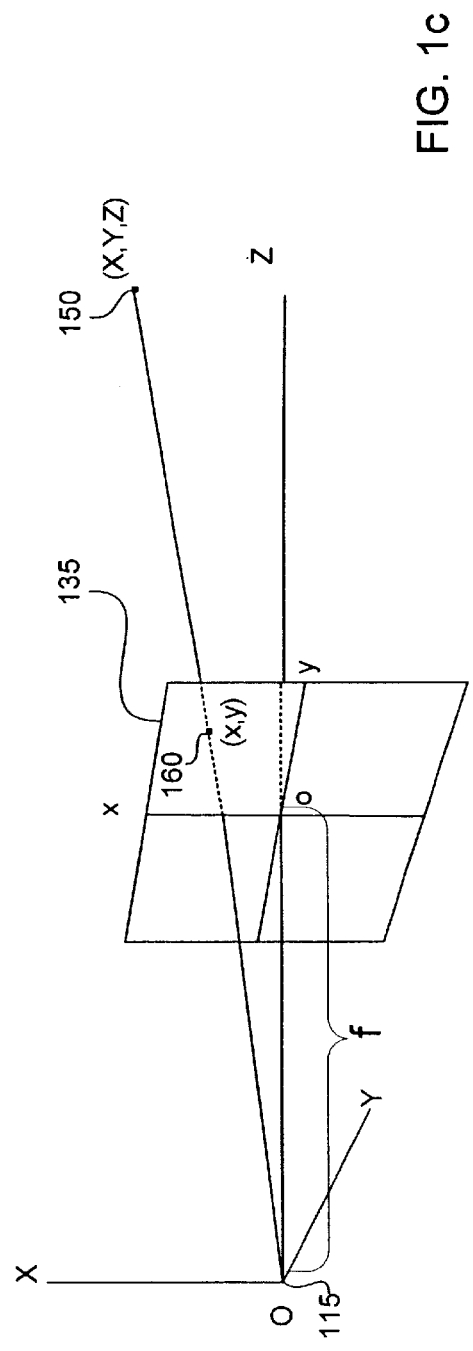
FIG. 1c depicts a perspective projection of a scene and a relationship between a space point and an image point.
Figure 2A:
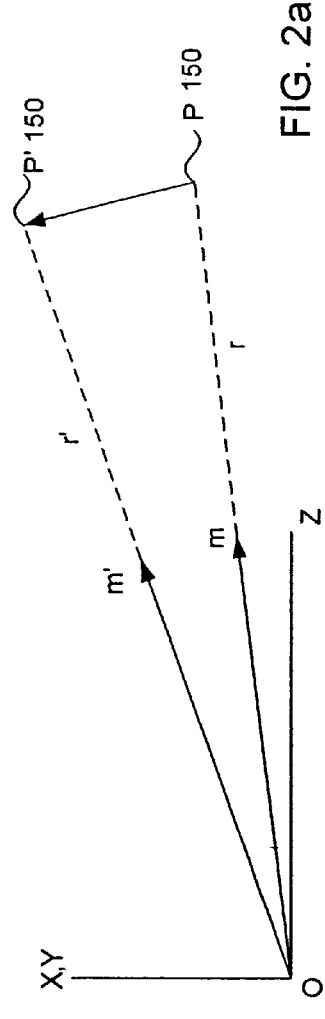
FIG. 2a depicts a camera motion with respect to the camera coordinate system according to one embodiment of the present invention.
Figure 2B:
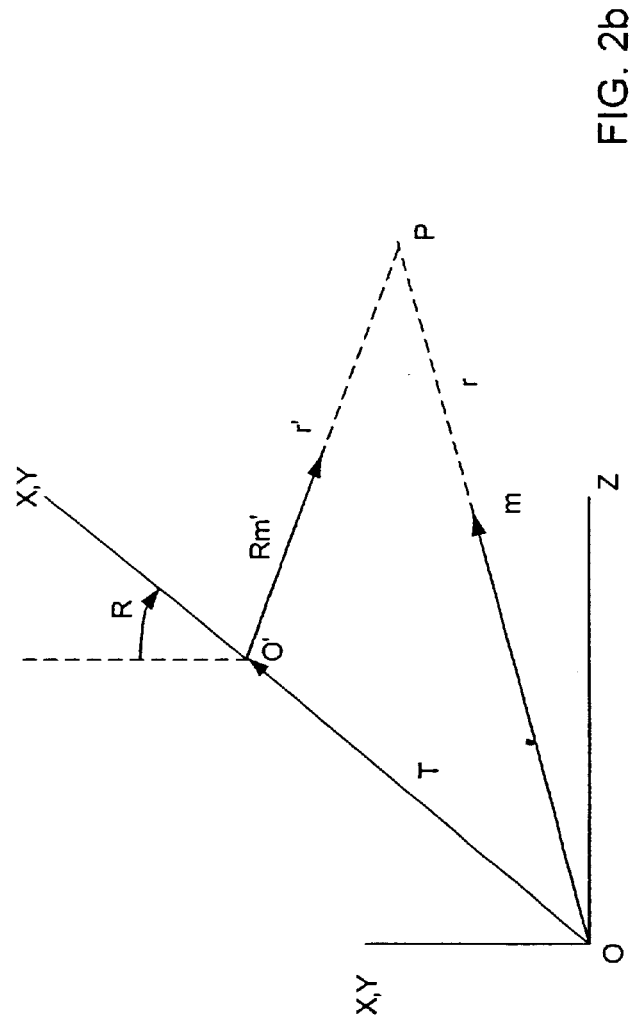
FIG. 2b depicts a camera motion with respect to the scene coordinate system according to one embodiment of the present invention.
Figure 3:
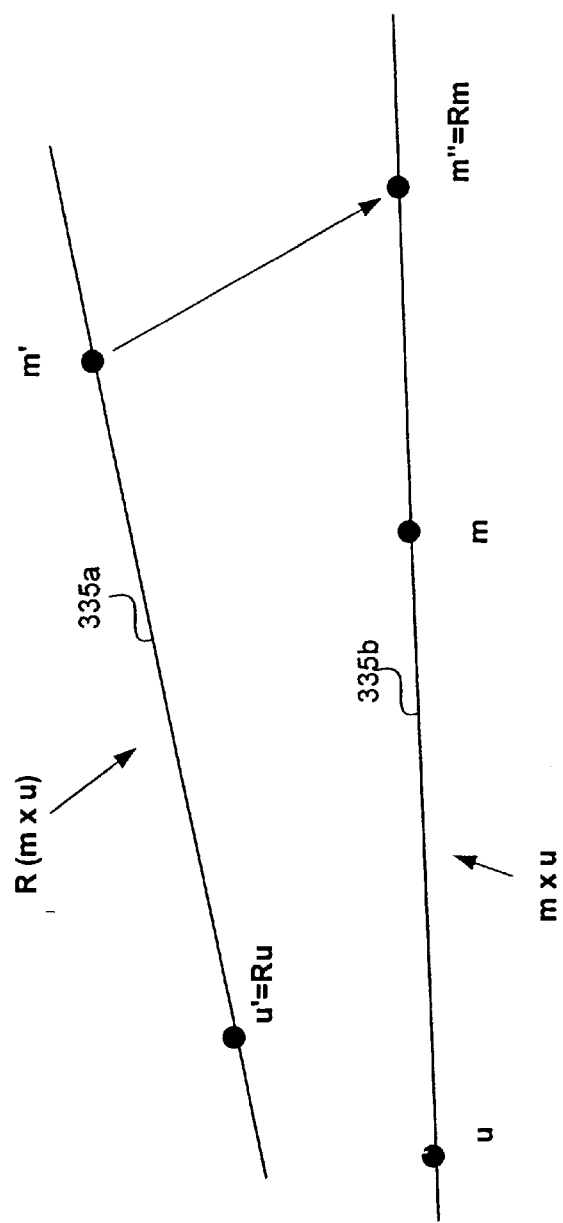
FIG. 3 depicts a relationship between epipoles and corresponding points within a 3-D scene.
Figure 6:
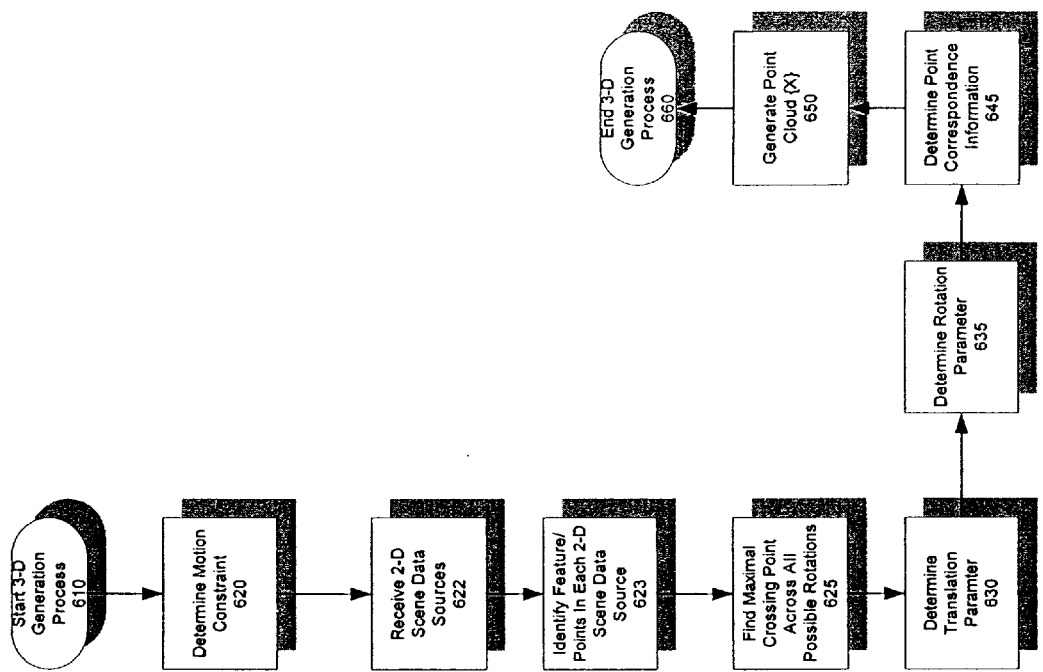
FIG. 6 is a flowchart that depicts an overall process for generating a 3-D point cloud from a plurality of 2-D scene data sources according to one embodiment of the present invention.

FIG. 6 is a flowchart that depicts an overall process for generating a 3-D point cloud from a plurality of 2-D scene data sources according to one embodiment of the present invention. The process is initiated in step 610. In step 620, a motion constraint is determined. In order to significantly reduce computational complexity, the motion constraint defines a maximum value of a ratio (r/r') and a minimum value of the ratio (r/r'), wherein the ratio (r/r') represents a ratio between a first distance (r) to an image point and a second distance (r') to the image point after a camera translation (T). Effectively the motion constraint defines a continuous range of values of possible camera translations, the range of values defining the length of each line segment. If the chosen camera angle and point correspondence are correct, the true epipole will lie somewhere on the line segment (that is the line segment will span a portion of an epipolar line).

In step 622, at least two 2-D scene data sources are received. 2-D scene data sources of the image are obtained either from traditional photographic imaging techniques or from digital imaging techniques. Each of the 2-D scene data sources is associated with a translation parameter and a rotation parameter respectively describing a camera translation and rotation. Each 2-D scene data source includes a plurality of image points. The correspondence of image points between any two 2-D scene data sources is unknown. Furthermore, an epipole is implicitly defined between any two of the 2-D scene data sources, wherein the epipole is a function of the translation parameter relating the 2-D scene image sources.

In step 623, a set of relevant features or points in each 2-D scene data source is identified. Identifying relevant points or features within each 2-D scene data source maybe accomplished using a variety of techniques. According to one embodiment, the image points can be found automatically using a comer detection algorithm. A comer detection algorithm works well if the relative camera positions and angles are not too large. Active methods are also helpful in situations where they are possible. For example, markers or points of light from a laser may have, optionally, been used in step 615 to make it easier to find 2-D image points. Unlike other active approaches, however, there is no need to use a grid pattern or use individual markers that can easily be matched across images. Instead, all markers can be identical, which makes their use cheaper and faster.

At this stage, known point match information between 2-D scene data sources may be indicated. Alternatively, it may be possible to place restrictions on possible point matches. These restrictions can range from having no information about point matches to having information for all correct point match pairs. Intermediate cases may provide information indicating that one point might match one of some subset of points on one of the other images. This case may arise, for example, when using an automatic point matching procedure, but with the likelihood that mistaken matches exist. Also, for example, restrictions may be obtained from known limits on camera motion. For example, it may be known that a point in one image cannot move beyond some 2-D distance in the next image.

In step 625, a search algorithm is conducted using any two of the 2-D scene data sources to find a point of maximal crossing of generated line segments. A set of discrete rotation parameters is defined. For any two scene data sources, a set of line segments is generated by taking all possible point matches between the images over all possible camera rotation angles subject to the motion constraint described above. The present invention relies upon the observation that corresponding points between two 2-D scene data sources will lie on the same epipolar line (when the points are considered with respect to a common rotation angle) if the rotation angle and point correspondence are both correct (i.e., there is a zero rotation angle of the points with respect to one another—the points are rotationally neutral with respect to one another).

In step 630, the translation parameter is determined. By searching over all possible point correspondences and rotation angles, a point of maximal crossing is determined. The point of maximal crossing defines the epipole and directly from this, the translation parameter is determined.

In step 635, the rotation parameter is determined. The rotation parameter generating the maximal crossing point defines the desired rotation parameter.

In step 645, point correspondence information is determined. This information is obtained by finding the point correspondences, which produced the line segments meeting at the point of maximal crossing.

In step 650, a point cloud {X} is generated. A 3-D point cloud {X} is determined as a function of the best rotation parameter, the best translation parameter and the point correspondence information using projective geometry relations.

The process ends in step 660.

Figure 7:
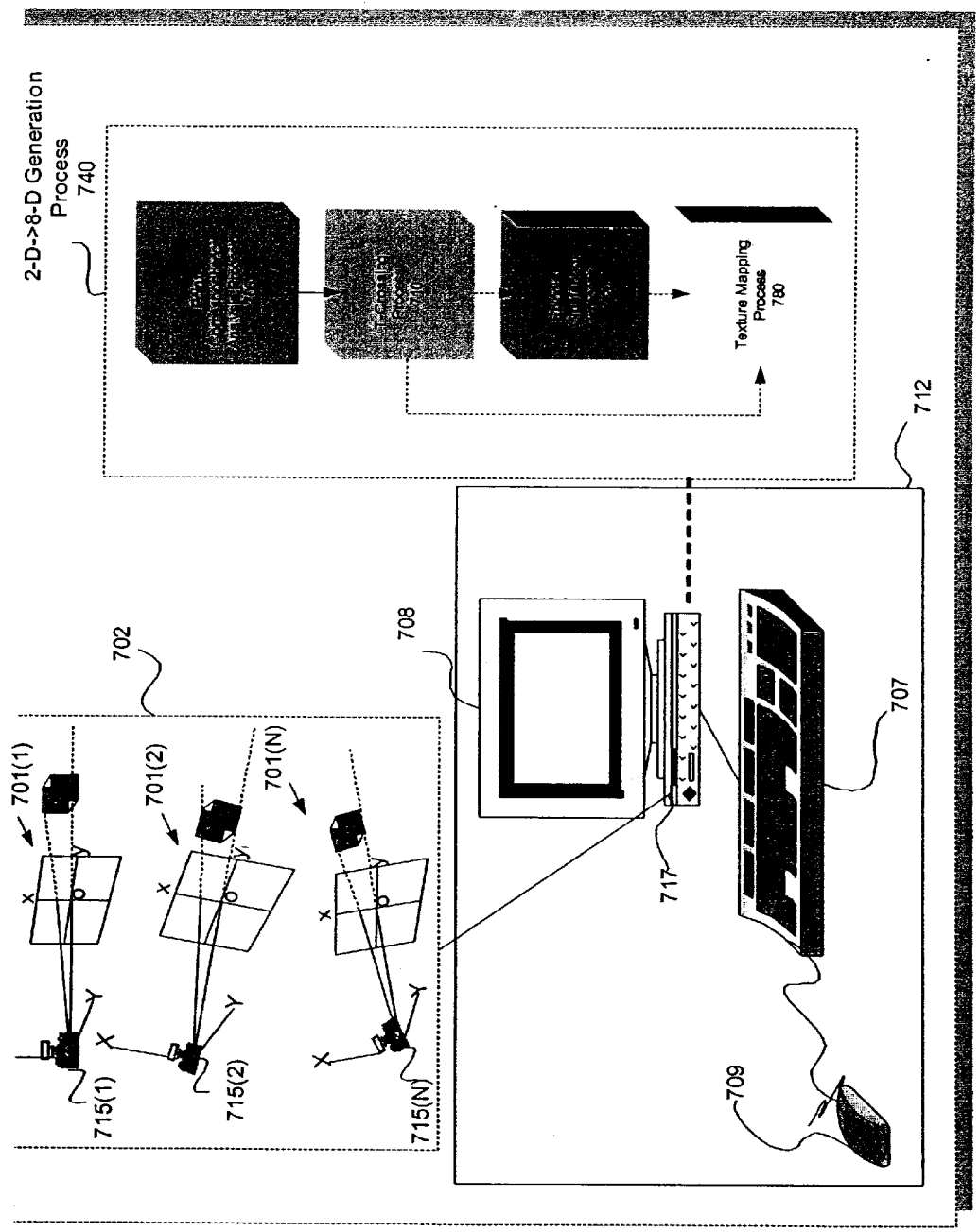
FIG. 7 depicts a system for generation of 3-D content from a plurality of 2-D sources using a UPMPC method according to one embodiment of the present invention.

FIG. 7 depicts a system for generation of 3-D content from a plurality of 2-D sources using a UPMPC method according to one embodiment of the present invention. As shown in FIG. 7, UPMPC 3-D generation system 712 includes CPU 717, display 708 and one or more input devices, in this case keyboard 707 and mouse 709.

2-D source information 702 is provided to CPU 717 for processing. For example, 2-D source information 702 may be made available on a magnetic storage device such as a hard disk (not shown), flash memory, etc. 2-D source information 702 includes a plurality of 2-D scene data sources 701 (1) through 701 (N), wherein 2-D scene data sources 701(1)-701(N) are generated by respective cameras 715(1)-715(N). 2-D scene data sources 701(1)-701(N) are analog or digital 2-D signals (images) of a 3-D scene each respectively associated with a particular camera motion {R, T}.

CPU executes 2-D->3-D generation process 740, which operates upon 2-D scene data source information 702. 2-D->3-D generation process 740 includes sub-processes point identification, and optional correspondence analysis, process 705, T-crossing process 710, epipolar clustering process 720 and texture mapping process 780. The details of the structure and operation of 2-D->3-D generation process 740 and sub-processes 705, 710, 720 and 780 are described in detail below.

Figure 8:
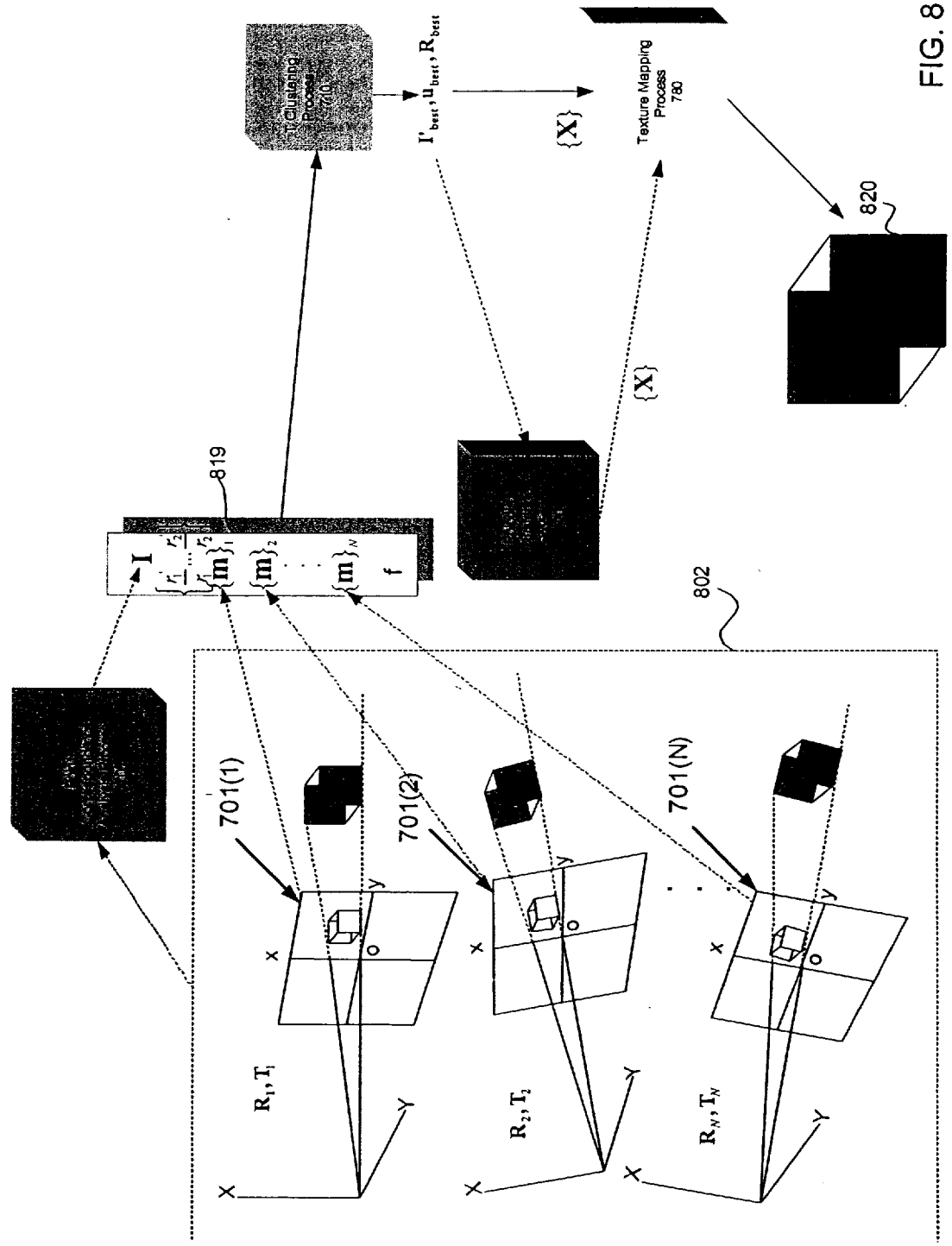
FIG. 8 is a schematic depicting an overall operation of a method for generating 3-D content from a plurality of 2-D sources according to one embodiment of the present invention.

FIG. 8 is a schematic depicting an overall operation of a method for generating 3-D content from a plurality of 2-D sources according to one embodiment of the present invention. Referring to FIG. 8, 2-D scene data sources 701(1)-701(N) are obtained (typically from a plurality of respective cameras 715(1)-715(N), see FIG. 7 and accompanying text). Note that each scene data source 701(1)-701 (N) is associated with a particular camera rotation matrix R and camera translation vector T. Input vector 819 is generated from 2-D scene data sources 701(1)-701(N). Input vector 819 includes, image N-vector sets $\{m\}_1$-$\{m\}_N$ index matrix I, motion constraint $$\left\{\frac{r'_1}{r_1} \ldots \frac{r'_2}{r_2}\right\},$$

and optionally focal length f. Image N-vector sets $\{m\}_1$-$\{m\}_N$ are respective sets of N-vectors corresponding to each 2-D scene data source 701(1)-701(N), wherein the N-vectors correspond respectively to image points obtained from capturing a 2-D image of the 3-D scene using the associated camera rotation matrix R and translation vector T. Typically scene data segments 701(1)-701(N) contain pixel data for a corresponding image. According to one embodiment, this pixel data is converted to N-vector format as follows:

$$m = N\begin{pmatrix} x - \frac{\text{width}}{2} \\ y - \frac{\text{height}}{2} \\ f \end{pmatrix}$$

where N is the normalization operator.

Index matrix I is an N×N' matrix, wherein each entry I[n,n'] is set to 1 if the 2-D point n in a first image corresponds to the same 3-D point as the 2-D point n' in a second image so that the pair n, n' correspond to the same 3-D point. Upon initialization, I[n,n'] is set=0 only if it is known that n and n' do not correspond. I is a matrix that embodies all known constraints between points. In particular, I reflects all information relating to known point correspondences (m,m') between image 1 and image 2. According to one embodiment, as shown in FIG. 8, 2-D source information 702 is provided to point correspondence analysis process 705 for determining point correspondences. According to one embodiment, for example, point correspondence analysis process 705 performs pattern recognition on images to determine point correspondences and appropriately fills index matrix I.

Motion constraint $$\left\{ \frac{r'_1}{r_1} \ldots \frac{r'_2}{r_2} \right\}$$

defines a maximum value of a ratio (r/r') and a minimum value of the ratio (r/r'), wherein the ratio (r/r') represents a ratio between a first distance (r) to an image point and a second distance (r') to the image point after a camera translation (T). r'/r may be known, for example, based upon the potential range of distance the camera may move between images.

Figure 9:
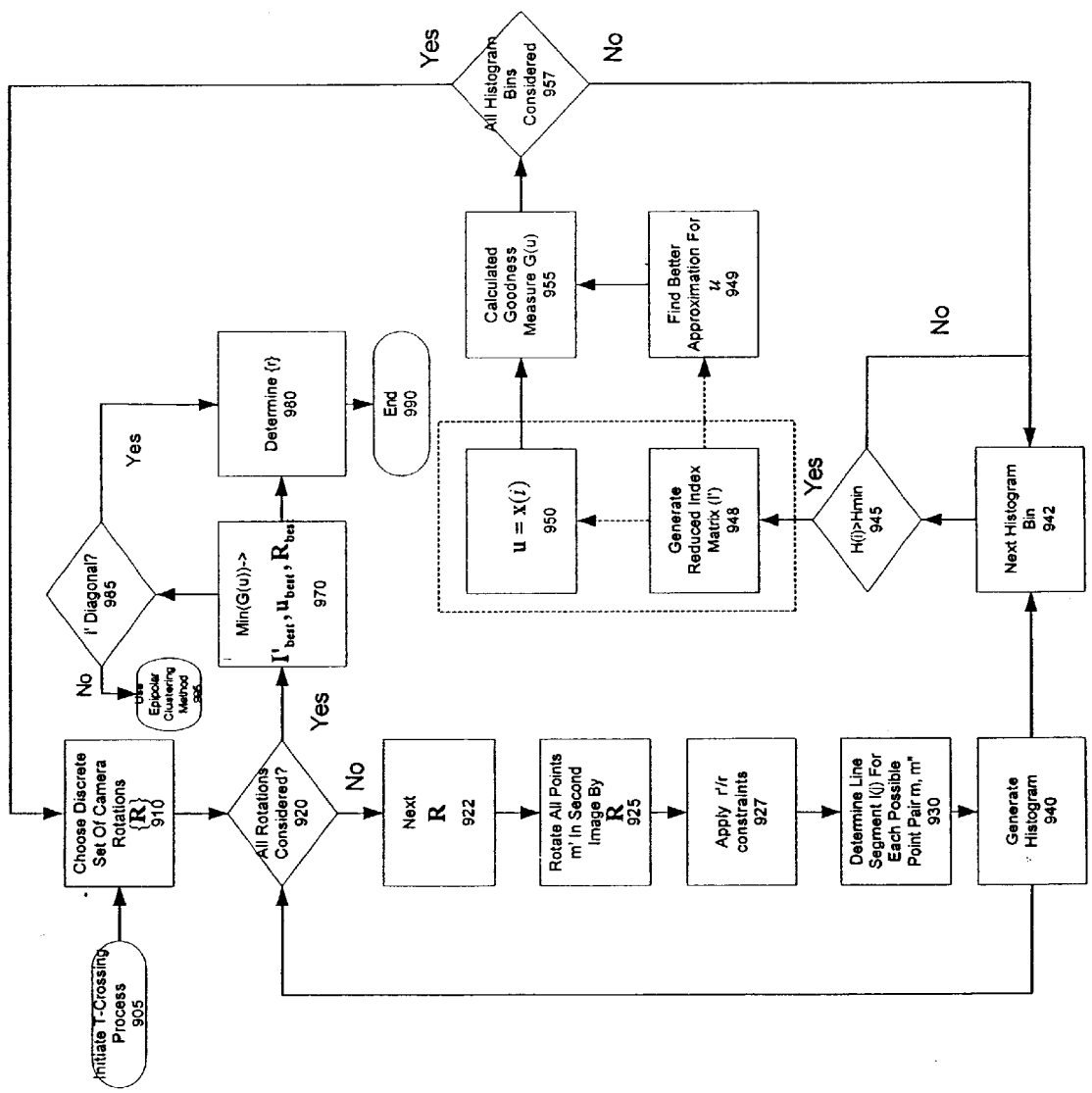
FIG. 9 is a flowchart depicting a T-crossing method according to one embodiment of the present invention.

FIG. 9 is a flowchart depicting a T-crossing method according to one embodiment of the present invention. The T-crossing algorithm receives as inputs I, $$\{m\}_1 - \{m\}_N, \quad \left\{ \frac{r'_1}{r_1} \ldots \frac{r'_2}{r_2} \right\},$$

and f, the meaning of these variables having been defined above with reference to FIG. 8. The T-crossing method operates on any two of N-vector sets $\{m\}_1 - \{m\}_N$ obtained respectively from two 2-D scene data sources 701. The process is initiated in step 905. In step 910, a discrete set of possible camera rotations {R}, which covers the range of possible R, is determined. According to one embodiment, this set is relatively sparse, for example, angles in 10 degree increments. Furthermore, according to one embodiment, known constraints on R may be incorporated into the analysis. Such constraints may be generated from knowledge that the camera motion {R, T} was restricted within a specific range. Specifically, each camera rotation R is a 3×3 rotation matrix that represents a rotation between a first camera and a second camera. In step 920, it is determined whether all rotations have been considered. If not ('no' branch of step 920), in step 922, the next rotation R is considered. In step 925, all points in {m'} are rotated by R such that m''=Rm'. As described above, when m and m' correspond to the same 3-D point and R is the correct rotation, the following relation holds:

$$Rm - r'm'' = T$$

The process then attempts to solve the following relation for u:

$$u = \frac{T}{|T|} = \frac{\left(m - \frac{r'}{r}m''\right)}{\left\|\left(m - \frac{r'}{r}m''\right)\right\|}$$

where the point on the image plane is the epipole and the line parameterized by r'/r is the epipolar.

In step 927, the motion constraint $$\left\{ \frac{r'_1}{r_1} \ldots \frac{r'_2}{r_2} \right\}$$

is applied. As described above, the motion constraint implies that u can only be on one segment of each line associated with a N-vector pair m, m''. This line segment gives the possible values of u for a pair m, m''. The correct u will be the common crossing of all lines corresponding to correct pairs of points assuming that R is correct.

In step 930, a line segment l(k) is determined for each possible pair m, m'' where k ∈ {1, ... N²}. In step 940, a histogram is generated. According to one embodiment, the histogram is generated by placing a 2-D grid i=(i,j), with i and j integers, over the image plane x=(x,y) such that i represents a discrete point x(i) in the 2-D space. A histogram H(i) is defined over the 2-D discrete space. According to one embodiment, in order to fill the histogram H(i), the following criterion is applied. For every pair of points n, n'for which the index matrix I[n,n']=1, H(i)=H(i)+1, for every grid region i, which is crossed by the line segment l(k).

In step 942, the net histogram bin is considered. If H(i)>Hmin ('yes' branch of step 945) where Hmin represents a minimum threshold flow continues with step 948. Otherwise ('no' branch of step 945) the next histogram bin is examined in step 942.

In step 948 a reduced index matrix I' is generated. In particular, for each I with a value of H(i)>Hmin the set of all pairs m, m'' which contributed to the H(i) are determined. That is, the lines crossing in the region H(i,j) are determined. Each of these lines is associated with a specific pair m, m''. For each of these pairs, a 1 is placed in the matrix I', and a zero is placed otherwise. In step 950, an associated N-vector vector u is determined. Specifically u=x(i). At this point, it is possible that the correct set of pairs (correct I') and the matching has been determined along with the calibration u=x(i) and R.

In step 949 optionally a better approximation u is determined.

In step 955, a goodness measure G(u) is determined for the histogram bin H(i). In step 957, it is determined whether all histogram bins have been considered. If not ('no' branch of 957), flow continues with step 942 and the next histogram bin is considered. Otherwise, flow continues with step 99 and the next rotation R is considered.

After all rotations R have been considered ('yes' branch of step 920), the solution I'$_{best}$, u$_{best}$, R$_{best}$ is determined, where I'$_{best}$, u$_{best}$, R$_{best}$ corresponds to the Min(G(u)).

In step 985, it is determined whether r is diagonal. If not ('no' branch of step 985), in step 995, the epipolar clustering method is applied.

In step 980, the set of distances {r} is determined. According to one embodiment the set of distances {R} is determine according to the following relation:

$$r = \frac{((u, m) - (m, Rm')(u, Rm'))}{(1 - (u, Rm')(m, Rm'))}$$

where (,) denotes inner product. The process ends in step 990.

Figure 10:
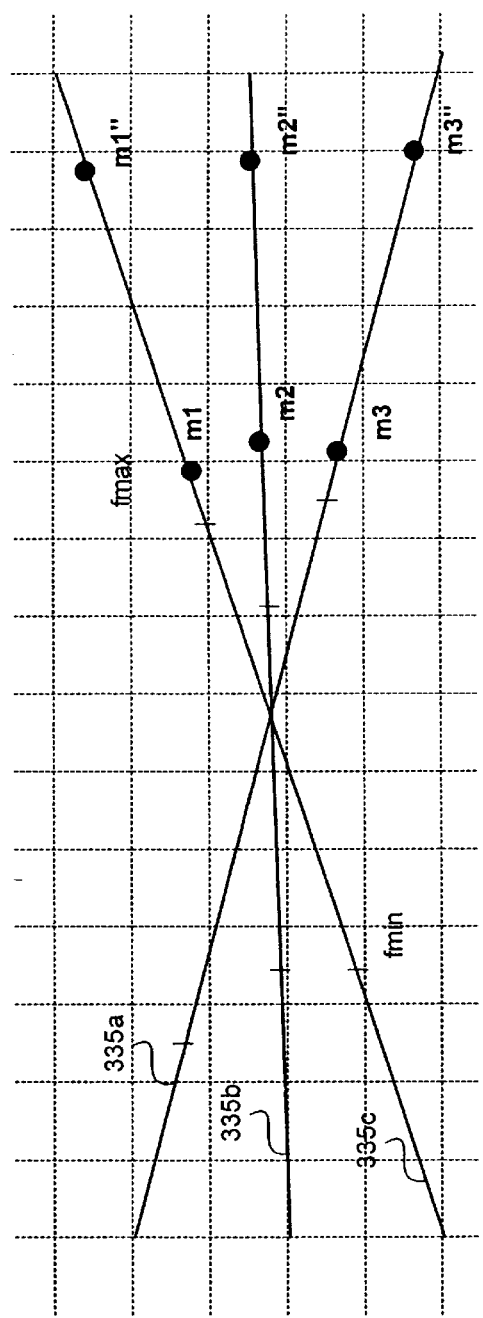
FIG. 10 illustrates an exemplary method for determining a correct epipole associated with a camera translation according to one embodiment of the present invention.

FIG. 10 illustrates an exemplary method for determining a correct epipole associated with a camera translation according to one embodiment of the present invention. As shown in FIG. 10, the 2-D image plane is partitioned into discrete 2-D partitions each partition associated with coordinates (i,j). The partition H(i,j) is incremented for each line crossing within the associated partition. Note that FIG. 10 only depicts line segments from correct matches.

Figure 11:
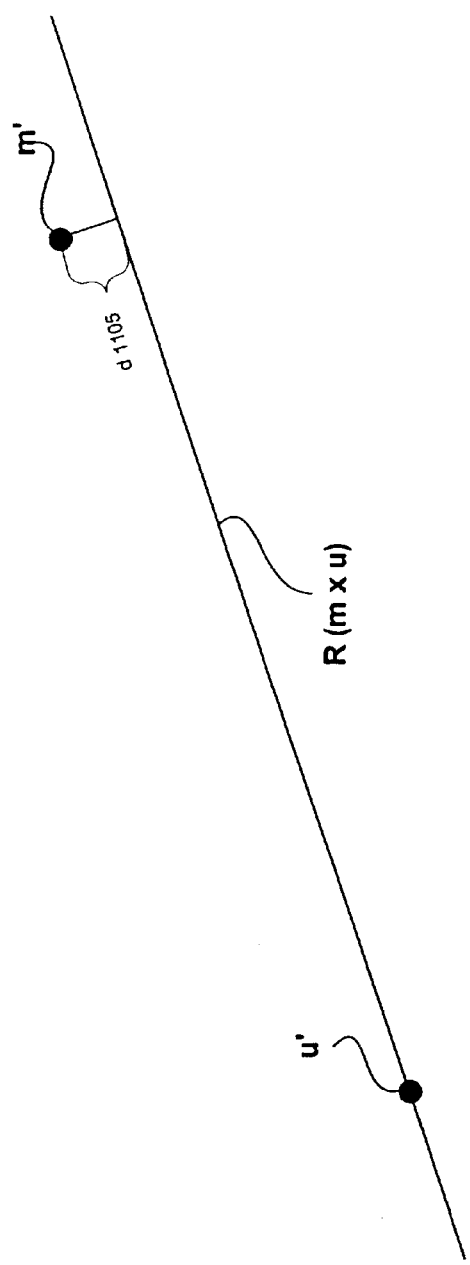
FIG. 11 illustrates a method for estimating error in determining point correspondences according to one embodiment of the present invention.

FIG. 11 illustrates a method for estimating error, the goodness measure G(u), in determining point correspondences according to one embodiment of the present invention. As shown in FIG. 11, if m and m' correspond to the same 3-D point, and if R and u are correct, then m' should lie on the epipolar line R (m×u). However, when R and u are in error, or if m and m' are not in the correct positions, then one measure of error is distance d 11105, the nearest distance from m' to the epipolar line.

The T-crossing method generates a reduced index matrix I', which is either completely diagonal or block diagonal with small blocks. I' will be block diagonal in the case where points in an image happen to lie on or close to the same epipolar line. This is due to the fact that all points in image 1 that accidentally share an epipolar line are mapped onto the same rotated epipolar line in image2.

Figure 12:
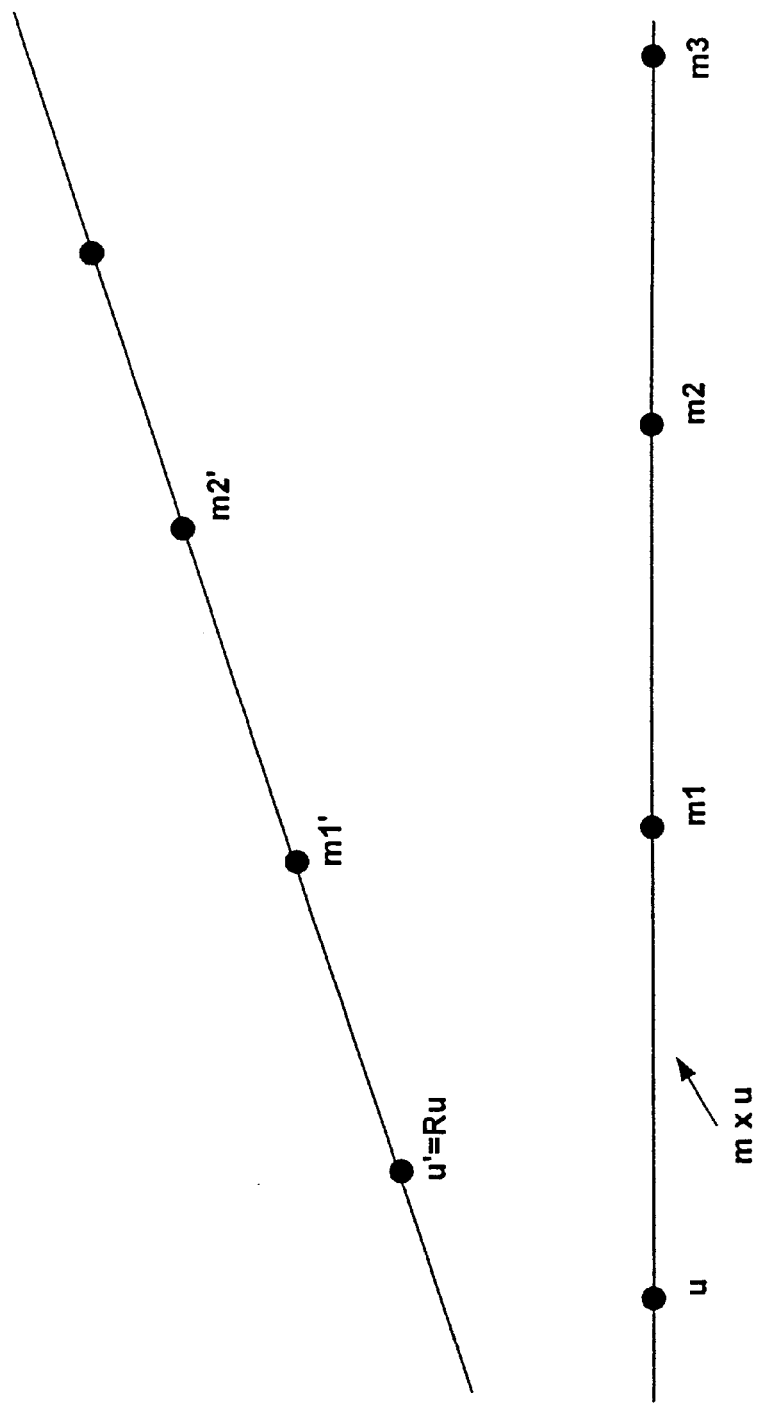
FIG. 12 illustrates a scenario in which I' would be a block diagonal matrix.

FIG. 12 illustrates a scenario in which I' would be a block diagonal matrix. Points m1, m2 m3 inadvertently lie on the same epipolar line in image 1, and thus have their corresponding points m1', m2', m3', . . . lying on the same epipolar line in image 2. Because the goodness measure G(u) measures the distance from the m' to the epipolar, this measure will not be able to uniquely match up the points {m} with {m'}. This will therefore lead to a self-contained block within I'.

The present invention provides a method for eliminating a degenerate solution provided by the T-Crossing method, herein referred to as the epipolar clustering method.

Figure 13:
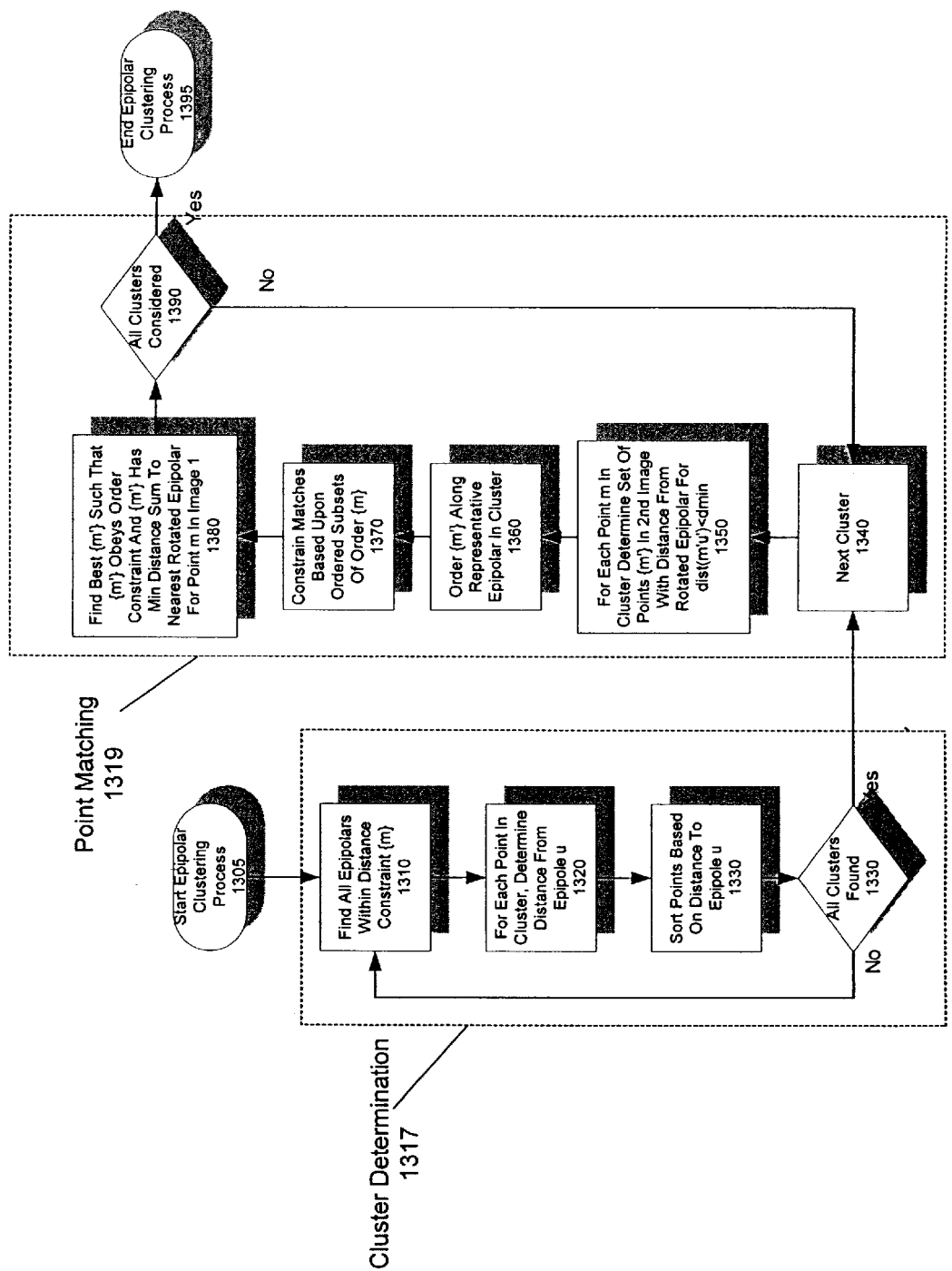
FIG. 13 is a flowchart depicting an epipolar clustering method according to one embodiment of the present invention.

FIG. 13 is a flowchart depicting an epipolar clustering method according to one embodiment of the present invention. The process is initiated in step 1305. In steps 1310–1330 clusters are determined 1317. In particular, it is desired to find all points on the first image, which lie on or very close to the same epipolar line (m×u). To determine each cluster, in step 1310, all epipolars within a distance constraint dmin are determined to generate an epipolar cluster set {m}. According to one embodiment, the distance between two epipolar lines is defined as the minimal distance of the point m1 on epipolar m1×u to the epipolar line m2×u. Once an epipolar cluster has been determined, in step 1320 for each point in the cluster a distance from that point to the epipole is determined. Then, in step 1330, the points in the cluster are sorted based upon the distance measure determined in step 1320. If all clusters have not been determined ('no' branch of step 1330, the next cluster is considered. Otherwise, ('yes' branch of step 1330), a point matching process is performed 1319 comprising steps 1340–1390.

In step 1340, the next cluster is examined (using cluster set determined in cluster determination process 1317). For each point m in the cluster a set of points {m'} are determined in the second image such that the distance between each m' and the rotated epipolar u'<dmin. In step 1360, all points m' in cluster set {m'} are ordered based upon their distance from rotated epipolar u'. In step 1370, matches between points are constrained to be ordered subsets of {m'} of order {m}. In step 1380, the best {m'} is determined such that {m'} obeys the order constraint of step 1370 and {m'} the sum of distances from each m' to the rotated epipolar u' is a minimum, i.e., $$\{m'\}_{best} = \left\{ \{m'\} : \min \sum^{N} |m' - u'| \right\}$$

In step 1390, it is determined whether all clusters have been considered. If not ('no' branch of step 1390), the next cluster is considered in step 1340. Otherwise, ('yes' branch of step 1390) the epipolar clustering process ends in step 1395.

What is claimed is:

1. A method for generating a 3-D point cloud representing a 3-D scene from a plurality of 2-D scene data sources, comprising:

(a) receiving a plurality of 2-D scene data sources, each 2-D scene data source associated with a rotation parameter, a translation parameter, and each 2-D scene data source including a plurality of image points, each image point associated with an undetermined space point;

(b) defining a motion constraint, the motion constraint defining a maximum value of a ratio (r/r') and a minimum value of the ratio (r/r'), wherein the ratio (r/r') represents a ratio between a first distance (r) to an image point and a second distance (r') to the image point after a camera translation (T);

(c) as a function of the motion constraint, for a first 2-D scene data source and a second 2-D scene data source determining a best rotation parameter, a best translation parameter and point correspondence information, the point correspondence information representing a correspondence between an image point associated with the first 2-D scene data source and an image point associated with the second 2-D scene data source;

(d) determining a 3-D point cloud {X} as a function of the best rotation parameter, the best translation parameter and the point correspondence parameter.

2. The method according to claim 1, wherein (c) further includes:

(i) for each possible point correspondence between an image point associated with the first 2-D scene data source and an image point associated with the second 2-D scene data source, generating a line segment as a function of the motion constraint;

(ii) for each of a plurality of possible rotation parameters, determining a point of maximal crossing point associated with the line segments generated in (i);

(iii) for the first and second 2-D scene data sources determining a best rotation parameter, wherein the best rotation parameter is associated with a best maximal crossing point;

(iv) for the first and second 2-D scene data sources determining a best translation parameter, wherein the best translation parameter is associated with an N-vector of the best maximal crossing point determined in (iii).

3. The method according to claim 1, wherein the translation parameter is a normalized vector $$\left(u = \frac{T}{|T|}\right)$$

associated with a direction of a camera translation and having unity magnitude.

4. The method according to claim 1, wherein the translation parameter is a vector (T) representing a translation of a camera position associated with the first scene data source relative to a camera position associated with the second scene data source.

5. The method according to claim 1, wherein the rotation parameter is a rotation matrix (R) representing a translation of a camera position associated with the first scene data source relative to a camera position associated with the second scene data source.

6. The method according to claim 1, wherein a distinct motion constraint is associated with each of a plurality of possible point correspondences between image points from the first 2-D scene data source and image points from the second 2-D scene data source.

7. The method according to claim 2, wherein each line segment is a portion of an epipolar line.

8. The method according to claim 1, wherein the translation parameter (T) is associated with an epipole, the epipole determined by a camera rotation and a camera translation relative to the first 2-D scene data source and the second 2-D scene data source.

9. A method for generating a 3-D point cloud representing a 3-D object comprising the steps of:

(a) determining a plurality of image points on at least two 2-D images, wherein each of the image points corresponds to a space point in 3-D space;

(b) determining a set of camera rotations;

(c) for each camera rotation, determining at least one epipolar line, wherein each epipolar line corresponds to a particular point matching;

(d) for each camera rotation determining a crossing quality parameter as a function of the at least one epipolar line, wherein the crossing quality parameter determines a best point matching;

(e) determining a best crossing quality parameter for the set of camera rotations, wherein the best crossing quality corresponds to a best camera rotation;

(f) for each of the plurality of image points, determining a distance parameter to a corresponding space point as a function of the best camera rotation and the best point match.

10. The method according to claim 9, wherein the quality crossing parameter is determined as a function of a number of epipolar line crossings within a predetermined area.

11. A system for generating a 3-D point cloud representing a 3-D scene from a plurality of 2-D scene data sources, comprising a processor, wherein the process or is adapted to (a) receive a plurality of 2-D scene data sources, each 2-D scene data source associated with a rotation parameter, a translation parameter, and each 2-D scene data source including a plurality of image points, each image point associated with an undetermined space point;

(b) define a motion constraint, the motion constraint defining a maximum value of a ratio (r/r') and a minimum value of the ratio (r/r'), wherein the ratio (r/r') represents a ratio between a first distance (r) to an image point and a second distance (r') to the image point after a camera translation (T);

(c) as a function of the motion constraint, for a first 2-D scene data source and a second 2-D scene data source determine a best rotation parameter, a best translation parameter and point correspondence information, the point correspondence information representing a correspondence between an image point associated with the first 2-D scene data source and an image point associated with the second 2-D scene data source;

(d) determine a 3-D point cloud {X} as a function of the best rotation parameter, the best translation parameter and the point correspondence parameter.

12. A program storage device for storing memory and instructions, the program storage device including instructions to:

(a) receive a plurality of 2-D scene data sources, each 2-D scene data source associated with a rotation parameter, a translation parameter, and each 2-D scene data source including a plurality of image points, each image point associated with an undetermined space point;

(b) define a motion constraint, the motion constraint defining a maximum value of a ratio (r/r') and a minimum value of the ratio (r/r'), wherein the ratio (r/r') represents a ratio between a first distance (r) to an image point and a second distance (r') to the image point after a camera translation (T);

(c) as a function of the motion constraint, for a first 2-D scene data source and a second 2-D scene data source determine a best rotation parameter, a best translation parameter and point correspondence information, the point correspondence information representing a correspondence between an image point associated with the first 2-D scene data source and an image point associated with the second 2-D scene data source;

(d) determine a 3-D point cloud {X} as a function of the best rotation parameter, the best translation parameter and the point correspondence parameter.

* * * * *